United States Patent
Kumagai

(10) Patent No.: US 10,269,056 B2
(45) Date of Patent: Apr. 23, 2019

(54) REQUEST PROCESSING SYSTEM, REQUEST PROCESSING METHOD, PROGRAM, AND INFORMATION STORAGE MEDIUM

(71) Applicant: Rakuten, Inc., Tokyo (JP)

(72) Inventor: Tomoharu Kumagai, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 296 days.

(21) Appl. No.: 14/432,213

(22) PCT Filed: Mar. 28, 2013

(86) PCT No.: PCT/JP2013/059387
§ 371 (c)(1),
(2) Date: Mar. 30, 2015

(87) PCT Pub. No.: WO2014/155629
PCT Pub. Date: Oct. 2, 2014

(65) Prior Publication Data
US 2015/0288643 A1      Oct. 8, 2015

(51) Int. Cl.
*G06Q 30/00* (2012.01)
*G06Q 30/06* (2012.01)
(Continued)

(52) U.S. Cl.
CPC ......... *G06Q 30/0635* (2013.01); *H04L 51/28* (2013.01); *H04L 67/1004* (2013.01); *H04L 67/1038* (2013.01)

(58) Field of Classification Search
CPC . G06Q 30/0635; H04L 51/28; H04L 67/1004; H04L 67/1038
(Continued)

(56) References Cited

U.S. PATENT DOCUMENTS 6,023,722 A * 2/2000 Colyer .................... H04L 29/06
709/201
6,141,759 A * 10/2000 Braddy ................. G06F 9/5044
709/203
(Continued)

FOREIGN PATENT DOCUMENTS

JP     2002-342296 A    11/2002
JP     2010-099144 A     5/2010
(Continued)

OTHER PUBLICATIONS

Partial translation of the office action for Japanese patent application No. 2014-077350 dated Jul. 1, 2014.
(Continued)

*Primary Examiner* — Yogesh C Garg
(74) *Attorney, Agent, or Firm* — HEA Law PLLC

(57) ABSTRACT

To proceed necessary processing, following a procedure different from one in normal time, when response different from a response in normal time should be conducted in executing processing upon a request from a request sender. A request processing system determines, based on at least one of an internal factor and an external factor, to respond to a processing request in a manner different from a normal manner, and when it is determined to respond to the processing request in the manner different from the normal manner, leads so that processing request having been sent from a request sender by way of a first method that requires an immediate response is sent by way of a second method that does not require an immediate response.

15 Claims, 12 Drawing Sheets

(51) Int. Cl.
  *H04L 12/58* (2006.01)
  *H04L 29/08* (2006.01)
(58) Field of Classification Search
  USPC ........................................ 705/26.81; 709/226
  See application file for complete search history.

(56) References Cited

U.S. PATENT DOCUMENTS

| | | | |
|---|---|---|---|
| 7,124,110 B1* | 10/2006 | Kemp, II | G06Q 40/04 705/37 |
| 2002/0072980 A1* | 6/2002 | Dutta | G06Q 30/06 705/26.62 |
| 2002/0087704 A1* | 7/2002 | Chesnais | H04L 29/06 709/228 |
| 2004/0019781 A1* | 1/2004 | Chari | H04L 63/1408 713/153 |
| 2005/0138626 A1* | 6/2005 | Nagami | H04L 67/1008 718/105 |
| 2006/0069763 A1* | 3/2006 | Kido | H04L 67/1008 709/223 |
| 2006/0212873 A1* | 9/2006 | Takahisa | G06F 9/5083 718/105 |
| 2007/0130313 A1* | 6/2007 | King | H04L 67/2819 709/223 |
| 2007/0201673 A1* | 8/2007 | Annadata | H04M 3/5235 379/265.01 |
| 2007/0274496 A1* | 11/2007 | Singh | H04M 3/382 379/210.02 |
| 2008/0046574 A1 | 2/2008 | Kinoshita et al. | |
| 2011/0261401 A1 | 10/2011 | Yabe et al. | |
| 2012/0030341 A1* | 2/2012 | Jensen | H04L 67/2804 709/224 |
| 2013/0003957 A1* | 1/2013 | Singh | H04M 3/493 379/218.01 |
| 2013/0060950 A1 | 3/2013 | Furuta et al. | |
| 2013/0262678 A1* | 10/2013 | Tung | G06F 9/5072 709/226 |
| 2014/0019639 A1 | 1/2014 | Ueno | |
| 2014/0269513 A1 | 9/2014 | Yu et al. | |

FOREIGN PATENT DOCUMENTS

| | | |
|---|---|---|
| WO | 2004/008309 A1 | 1/2004 |
| WO | 2005/112389 A2 | 11/2005 |
| WO | 2012/126423 A2 | 9/2012 |
| WO | 2012/133290 A1 | 10/2012 |

OTHER PUBLICATIONS

The Office Action dated Mar. 10, 2017, for corresponding EP Patent ApplicationNo. 13880323.4.

* cited by examiner

FIG.6

| BUY | PRODUCT | PRICE | QUANTITY | |
|---|---|---|---|---|
| ☐ | LIMITED TIME PUDDING | ¥1200 | 1 | REMOVE |
| ☐ | LARGE RICE CRACKER | ¥500 | 3 | REMOVE |

SHOPPING CART

SHOP NAME: YUGO

PROCEED TO PURCHASE

FIG.7

ORDER CONFIRMATION

SHOP NAME: YUGO

| TOTAL PRODUCT PRICE | SHIPPING FEE | POINT USE | TOTAL PAYMENT |
|---|---|---|---|
| ¥2700 + | ¥300 − | 0 = | ¥3000 |

| | | |
|---|---|---|
| POINT USE | NO | EDIT |
| PAYMENT METHOD | CREDIT CARD<br>LAST FOUR DIGITS OF CREDIT CARD NUMBER 9999 | EDIT |
| SHIPPING METHOD | PACKAGE-DELIVERY SERVICE | EDIT |
| DESIGNATION OF DELIVERY DATE | NONE | EDIT |
| SHIPPING DESTINATION | 〒000-0000<br>4-12-3, HIGASHI SHINAGAWA, SHINAGAWA-KU, TOKYO<br>RAKUTEN TARO | EDIT |

PLACE ORDER

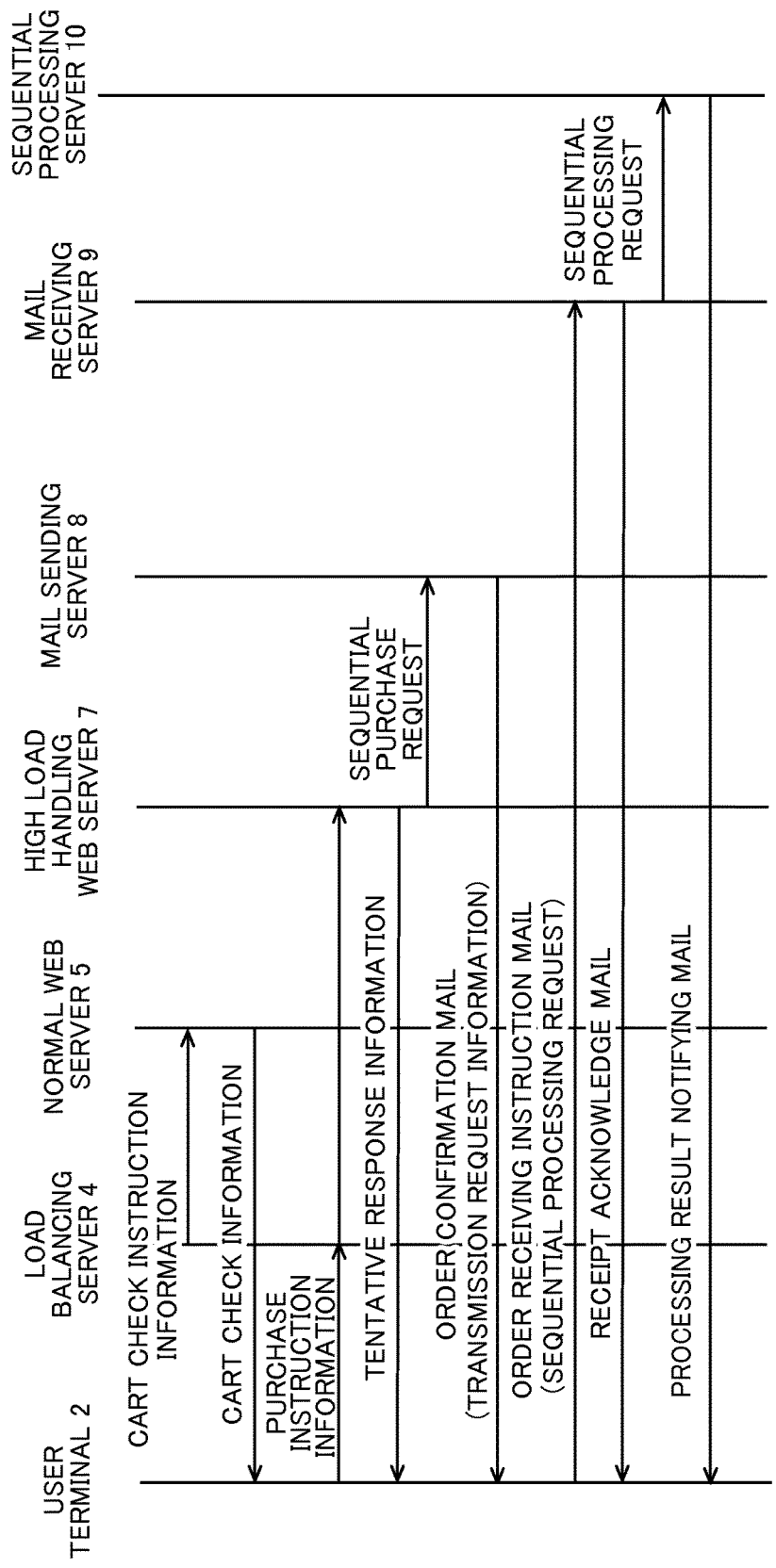

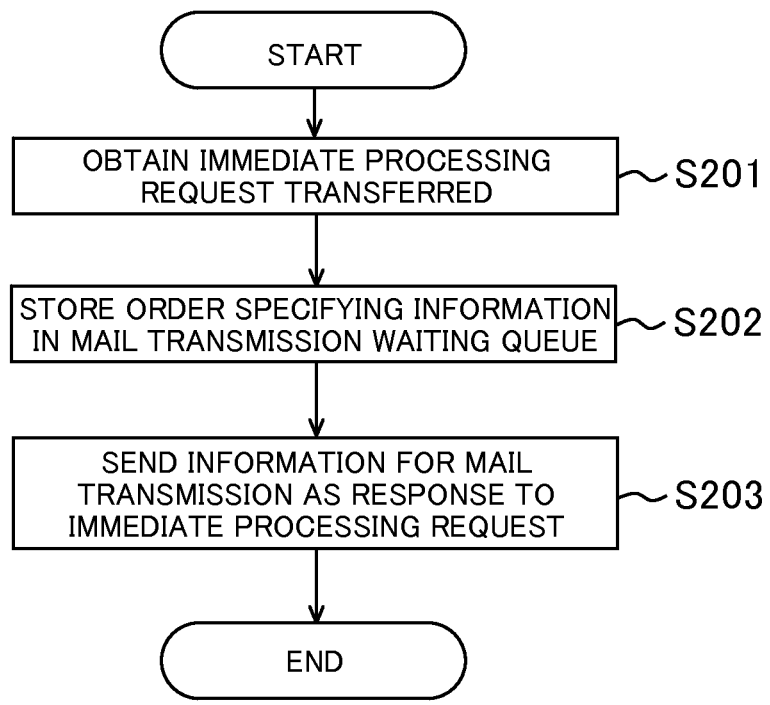

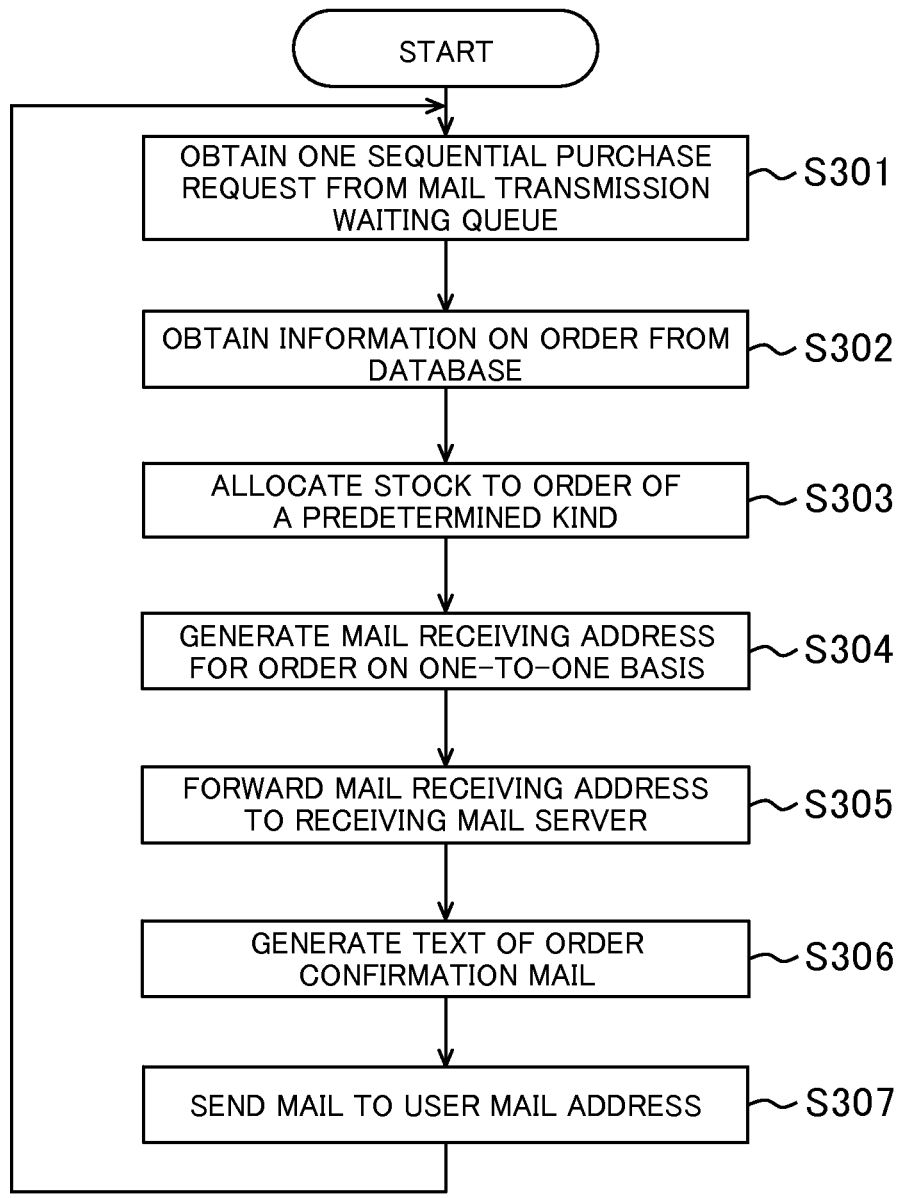

FIG.11

```
ORDER CONFIRMATION MAIL
PLEASE REPLY TO THIS MAIL WHEN THE ORDER BELOW IS CORRECT.
RECEIPT OF REPLY BY OUR SITE MAKES RECEIPT OF ORDER.

SHOP NAME: YUGO
ORDER DATE: 23:30:00 01-03-2013
PAYMENT METHOD: REGISTERED CREDIT CARD
POINT USE: NO
SHIPPING METHOD: PACKAGE-DELIVERY SERVICE
SHIPPING DESTINATION:〒000-0000
                     4-12-3, HIGASHI SHINAGAWA, SHINAGAWA-KU,
                     TOKYO   RAKUTEN TARO
PRODUCT ORDERED:
  LIMITED TIME PUDDING          PRICE  ¥1200 × 1
  LARGE RICE CRACKER            PRICE  ¥500  × 3

TOTAL PRODUCT PRICE    ¥2700
SHIPPING FEE           ¥300
POINT USE                 0
_____

TOTAL PAYMENT          ¥3000

TO CHANGE CONTENT, PLEASE CLICK THE LINK BLOW TO ACCESS
ORDER CONFIRMATION SCREEN OR ORDER AGAIN VIA SHOPPING
CART BUTTON ON THE TOP PAGE.
http://www.rakuten.com/xxx/rktn.cgi
```

REQUEST PROCESSING SYSTEM, REQUEST PROCESSING METHOD, PROGRAM, AND INFORMATION STORAGE MEDIUM

CROSS REFERENCE TO RELATED APPLICATIONS

This application is a National Stage of International Application No. PCT/JP2013/059387 filed on Mar. 28, 2013, the content of which is incorporated herein by reference in its entirety.

TECHNICAL FIELD

The present invention relates to a request processing system, a request processing method, a program, and an information storage medium.

BACKGROUND ART

In a system for electronic commerce through the Internet, it is known that there is a case in which many users concurrently access the system within a short period of time. With access congestion, processing of a server and a network device cannot keep up with the increased accesses, which causes a problem that orders from users cannot be processed. In order to avoid this situation, it is known that, for example, the number of accesses at peak is estimated in advance, and a hardware and network circuit lines that can process accesses at peak are prepared. Further, there is a known system that can increase of the number of servers autoatically so as to scale out, depending on the load imposed (for example, Patent Literature 1).

CITATION LIST

Patent Literature

Patent Literature 1: Japanese Patent Laid-open Publication No. 2002-342296

SUMMARY OF INVENTION

Technical Problem

However, an approach of reinforcing the hardware resource may not be practicable as measures on the assumption of a case in which continuation of normal response is difficult or inappropriate to be achieved.

As one example, speaking of congestion control, preparation of resources in accordance with accesses at peak may not be readily achieved. This is because, for example, preparation of resources in accordance with accesses at peak results in a reduced rate of operation in normal time, which means deterioration in cost efficiency, and further because accurate estimation of the number of accesses at peak is difficult to be made.

An object to be achieved by the invention is to execute necessary processing by way of a procedure different from a normal procedure, when response different from one in normal time should be conducted in executing processing in response to a request from a request sender.

Solution to Problem

In order to achieve the above described object, a request processing system according to the present invention includes a determination unit for determining, based on at least one of an internal factor and an external factor, to respond to a processing request in a manner different from a normal manner; and a leading unit for leading, when the determination unit makes the determination, so that the processing request sent from a request sender by way of a first method that requires an immediate response is sent by way of a second method that does not require an immediate response.

A request processing method according to the present invention includes a determination step of for determining, based on at least one of an internal factor and an external factor, to respond to a processing request in a manner different from a normal manner; and a leading step for leading, when the determination is made at the determination step, so that the processing request sent from a request sender by way of a first method that requires an immediate response is sent by way of a second method that does not require an immediate response.

A program according to the present invention causes a computer to execute processing for determining, based on at least one of an internal factor and an external factor, to respond to a processing request in a manner different from a normal manner, and leading, when it is determined to respond to the processing request in the manner different from the normal manner, so that the processing request sent from a request sender by way of a first method that requires an immediate response is sent by way of a second method that does not require an immediate response.

A computer readable storage medium according to the present invention stores the above described program.

According to the present invention, in a situation in which processing is executed in response to a request from a request sender and a response different from that in a normal time should be conducted, it is possible to execute necessary processing by way of a procedure different from a normal procedure.

In one aspect of the present invention, when the determination unit makes the determination, the leading unit may lead so that the processing request is sent by way of the second method, the processing request following another processing request and making a series of requests with the another processing request sent from the request sender by way of the first method.

In one aspect of the present invention, the leading unit may inform the request sender of destination specifying information for specifying a destination to which the processing request is sent by the second method.

In one aspect of the present invention, the leading unit may send leading information including the destination specifying information to a destination designated by the request sender by way of the second method.

In one aspect of the present invention, the leading unit may send confirmation requesting information including required confirmation information which the request sender should confirm in connection with a transaction including the processing request to the destination separately from the leading information by way of the second method in order to lead so that the processing request is sent to a destination specified by the destination specifying information by way of the second method in reply to the required confirmation information.

In one aspect of the present invention, the request processing system may further include informing unit for reply that the confirmation requesting information is sent by the second method with respect to another request sent from the request sender by way of the first method immediately before the processing request.

In one aspect of the present invention, the request processing system may further include a generation unit for generating the destination specifying information for every transaction.

In one aspect of the present invention, the request processing system may further include an invalidating unit for invalidating, when a predetermined period of time elapses after the destination specifying information is generated by the generation unit, a destination specified by the destination specifying information.

In one aspect of the present invention, the transaction may be made to order a product or a service, and the request processing system may further include a stock allocation unit for tentatively allocating a stock of a product or a service that should be ordered in a transaction corresponding to the destination specifying information generated by the generation unit, so as to be correlated to the destination specifying information, and an allocation releasing unit for deallocating, when the invalidating unit invalidates the destination specifying information, a stock tentatively allocated so as to be correlated to the destination specifying information invalidated.

In one aspect of the present invention, the request processing system may further include a first processing unit for immediately executing predetermined processing in response to the processing request sent by the first method and responding to the request sender immediately after completion of the predetermined processing; and a second processing unit for executing, in sequence, alternative processing of the predetermined processing according to the processing request sent by the second method.

In one aspect of the present invention, the second processing unit may execute the alternative processing while considering a time of receiving the processing request sent by the second method as a received time of the processing request.

In one aspect of the present invention, the processing request may be a request of order receiving processing for receiving an order of a product or a service, and the second processing unit may sort a plurality of processing requests, based on an object of the order as a key, and collectively executes the order receiving processing for every object of the order.

In one aspect of the present invention, the second processing unit may execute preferentially the order receiving processing relevant to a product or a service of which order should be fixed earlier.

In one aspect of the present invention, the request processing system may further include a load obtaining unit for obtaining a value indicating a magnitude of a load on a system, wherein when the value obtained by the load obtaining unit is equal to or greater than a predetermined threshold, the determination unit may determine to respond to a processing request in a manner different from the normal manner.

In one aspect of the present invention, the request processing system may further include a rank obtaining unit for obtaining rank specifying information for specifying a rank of the request sender, wherein when the rank of the request sender specified by the rank specifying information obtained by the rank obtaining unit is within a predetermined range, the determination unit may determine to respond to a processing request in a manner different from the normal manner.

BRIEF DESCRIPTION OF DRAWINGS

FIG. 6 shows one example of a shopping cart check screen;

FIG. 7 shows one example of an order confirmation screen;

FIG. 8 is a sequence diagram showing one example of a flow of processing executed when the first communication method and a second communication method are used;

FIG. 9 shows one example of a flow of processing of a tentative response unit;

FIG. 10 shows one example of a flow of processing of a transmission request unit;

FIG. 11 shows one example of an order confirmation mail; and

DESCRIPTION OF EMBODIMENTS

Figure 1:
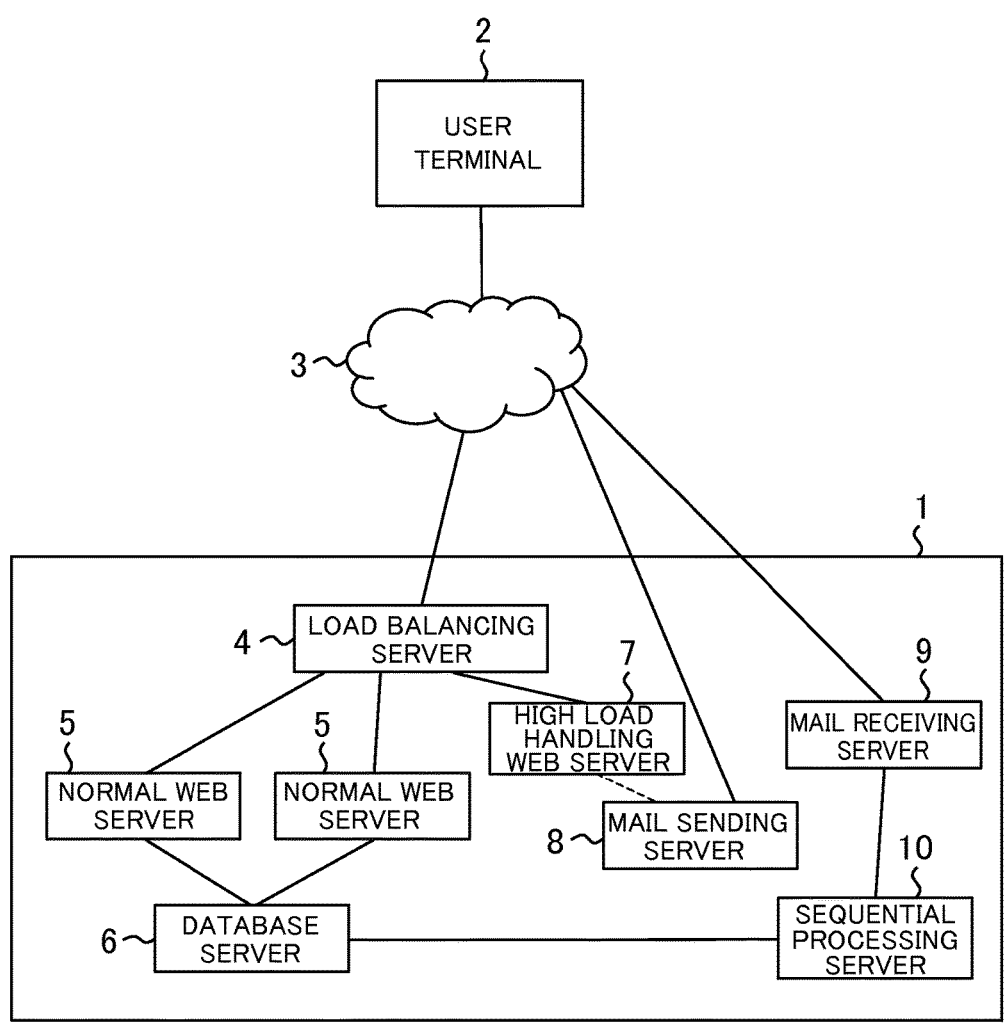
FIG. 1 shows one example of a structure of an electronic commerce system according to an embodiment of the present invention.

In the following, an embodiment of the present invention will be described, based on the drawings. Note that as to structures having the same reference numerals, duplicated descriptions are avoided.

FIG. 1 shows one example of a hardware structure of an electronic commerce system 1 according to an embodiment of the present invention. The electronic commerce system 1 is a system for processing a request for order, shipping, settlement (payment), or the like, of a product or a service sent from a user terminal 2 via a network 3. The following description is based on an assumption that the system is an electronic shopping mall system for providing a place for electronic commerce to a plurality of shops. Note that the term product mentioned below includes a service unless otherwise stated.

The electronic commerce system 1 includes a load balancing server 4, a plurality of normal web servers 5, a database server 6, a high load handling web server 7, a mail sending server 8, a mail receiving server 9, and a sequential processing server 10. The load balancing server 4 is a so-called load balancer, and transfers an http request from the user terminal 2 in a manner that a load on each normal web server 5 does not reach a limit. The load balancing server 4 regularly obtains information indicating a load on the electronic commerce system 1, and transfers an http request from the user terminal 2 to any of the plurality of normal web servers 5 or the high load handling web server 7, based on the information.

The normal web server 5 processes various http requests from the user terminal 2 on a real time basis, and sends a result of processing back to the user terminal 2 as an http response to the http request. The high load handling web server 7, the mail sending server 8, the mail receiving server 9, and the sequential processing server 10 execute processing relevant to an http request when a value indicating a load on the electronic commerce system 1 exceeds an upper limit. Details on the processing of these servers will be described later. Note that a communication protocol using an http request and an http response is referred to as an http protocol. An http protocol is a communication protocol on the assumption that an http response to an http request is made within a predetermined period of time. A request made according to a communication method, such as the http protocol, on the assumption that a response is sent on a real time basis will be hereinafter referred to as an immediate processing request.

The database server 6 stores a product master, a client database, a database (an order database) for order information including a product order, settlement and shipping methods, and the like, sent from a user, and other databases. The database server 6 executes a so-called database management software to thereby store and manage these data. The order information is one type of so-called transaction data.

Figure 2:
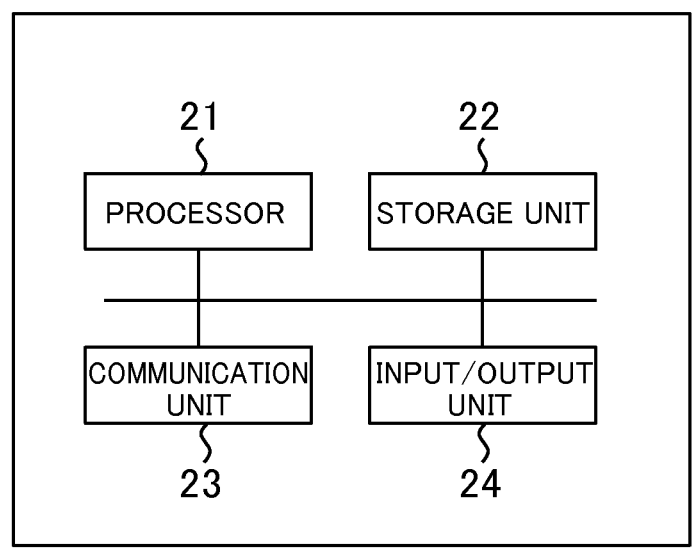
FIG. 2 shows one example of a hardware structure of a server included in an electronic commerce system.

FIG. 2 shows one example of a hardware structure of each server included in the electronic commerce system 1. Each of the load balancing server 4, the plurality of normal web servers 5, the database server 6, the high load handling web server 7, the mail sending server 8, the mail receiving server 9, and the sequential processing server 10 includes a processor 21, a storage unit 22, a communication unit 23, and an input/output unit 24.

The processor 21 operates according to a program stored in the storage unit 22. The processor 21 controls the communication unit 23 and the input/output unit 24. The above mentioned program may be provided via the Internet or the like or as being stored in a computer readable storage medium, such as a flash memory, a DVD-ROM, or the like.

The storage unit 22 is formed using a memory element, such as a RAM, a flash memory, or the like, or a hard disk drive. The above described program is stored in the storage unit 22. Further, information and operation results inputted from the respective units are also stored in the storage unit 22.

The communication unit 23 implements a function for communicating with other devices, and is formed using, for example, an integrated circuit of a wireless LAN and an antenna. Under control by the processor 21, the communication unit 23 inputs information received from other devices to the processor 21 and the storage unit 22, and sends information to other devices.

The input/output unit 24 is formed using a video controller or a controller for obtaining data from an input device, such as a keyboard, a mouse, or the like. Under control by the processor 21, the input/output unit 24 outputs display data to a display output device, and obtains data inputted by a user operating the input device.

Figure 3:
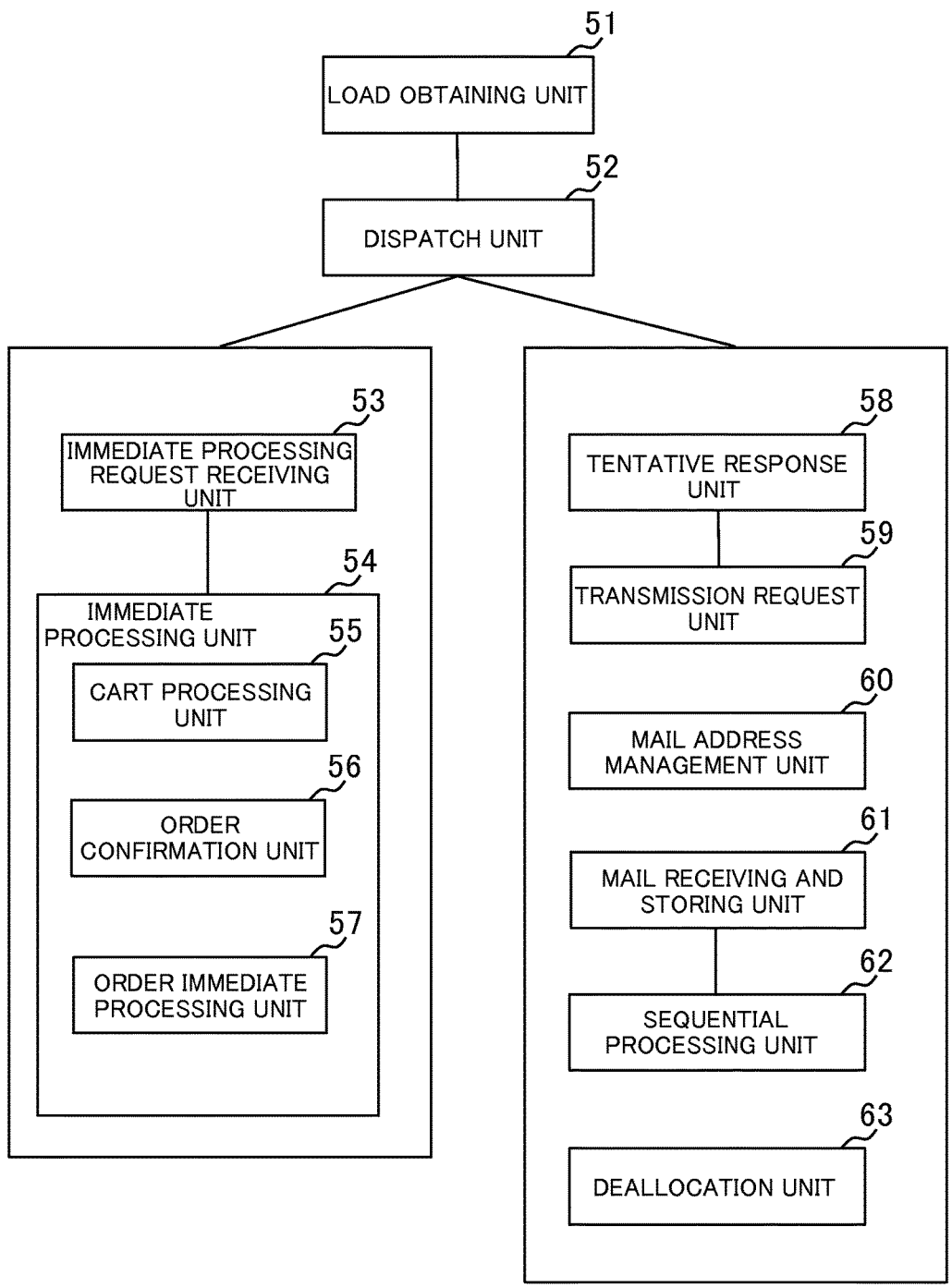
FIG. 3 is a functional block diagram showing functions implemented in an electronic commerce system according to an embodiment of the present invention.

FIG. 3 is a functional block diagram showing functions implemented in the electronic commerce system 1 according to an embodiment of the present invention. The electronic commerce system 1 functionally includes a load obtaining unit 51, a dispatch unit 52, an immediate processing request receiving unit 53, an immediate processing unit 54, a tentative response unit 58, a transmission request unit 59, a mail address management unit 60, a mail receiving and storing unit 61, a sequential processing unit 62, and an deallocation unit 63. The immediate processing unit 54 includes a cart processing unit 55, an order confirmation unit 56, and an order immediate processing unit 57.

The load balancing server 4 implements the load obtaining unit 51 and the dispatch unit 52. The normal web server 5 implements the immediate processing request receiving unit 53 and the immediate processing unit 54. The high load handling web server 7 implements the tentative response unit 58. The mail sending server 8 implements the transmission request unit 59. The mail receiving server 9 implements the mail receiving and storing unit 61 and the mail address management unit 60. The sequential processing server 10 implements the sequential processing unit 62 and the deallocation unit 63. More specifically, each of these functions is implemented by causing the processor 21 included in a server where the function is implemented to execute a program stored in the storage unit 22 and to control the communication unit 23 and the like.

In the following, the respective functions implemented in the electronic commerce system 1 will be described referring to the drawings such as sequence diagrams, flows of processing, and the like.

Figure 4:
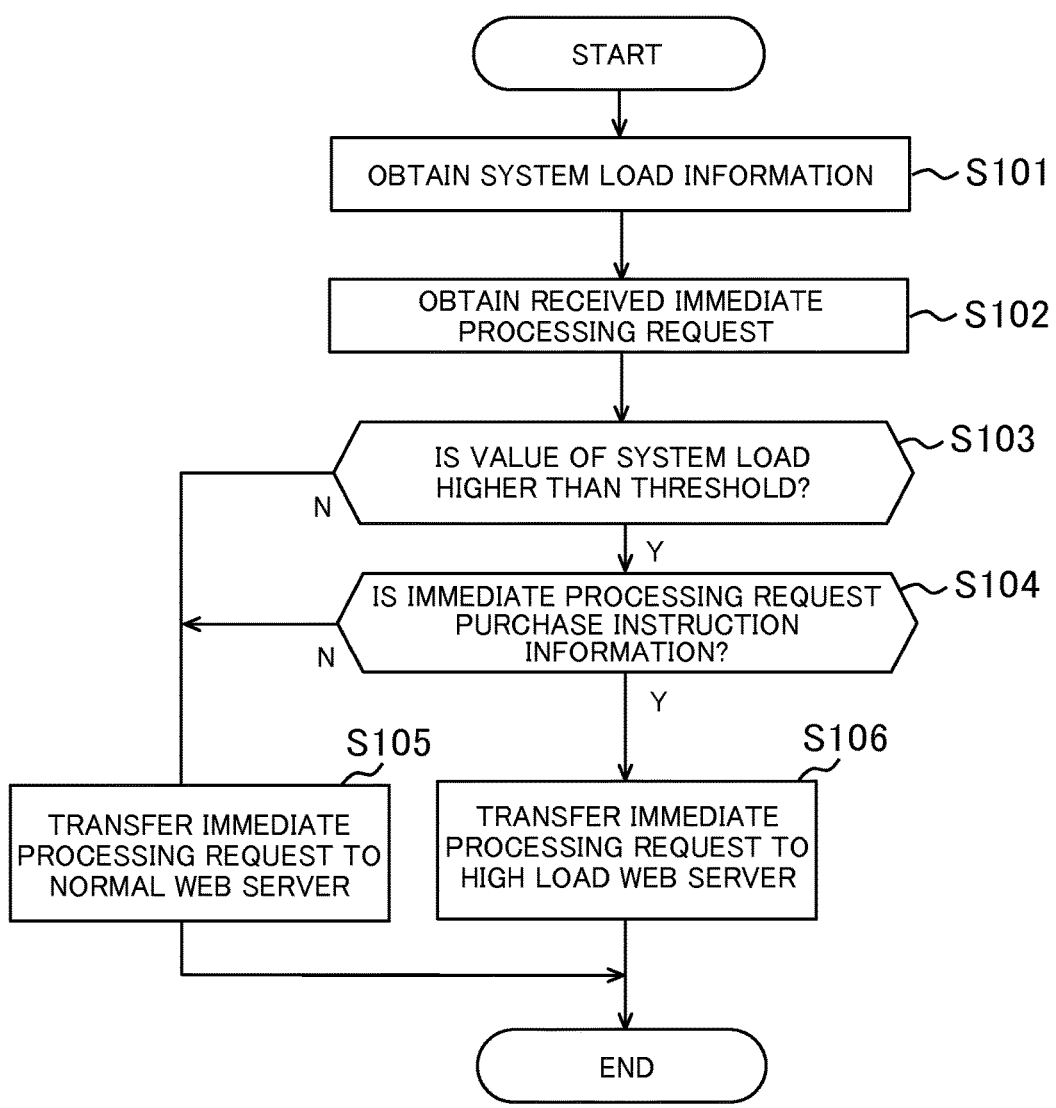
FIG. 4 shows one example of a flow of processing of a load obtaining unit and a dispatch unit.

FIG. 4 shows one example of a flow of processing of the load obtaining unit 51 and the dispatch unit 52. The processing shown in FIG. 4 is executed every receipt of an immediate processing request from the user terminal 2.

The load obtaining unit 51 is implemented using mainly the processor 21, the storage unit 22, and the communication unit 23 of the load balancing server 4. The load obtaining unit 51 obtains information indicating a load on the system (step S101). Information indicating a load on a system may be the number of http sessions being processed by each of the normal web servers 5 or a value calculated based on the CPU usage rate or the memory usage rate of the normal web server 5 and the database server 6 or the like.

The dispatch unit 52 is implemented mainly using the processor 21, the storage unit 22, and the communication unit 23 of the load balancing server 4. The dispatch unit 52 determines, based on at least one of an internal factor and an external factor, whether to respond to a processing request according to a normal communication method (a first communication method) or a communication method different from the normal communication method (a second communication method), and transfers an immediate processing request into either the normal web server 5 or the high load handling web server 7, based on the determination. In the above, based on information such as a value indicating a load on a system obtained by the load obtaining unit 51, the dispatch unit 52 determines to respond to a processing request according to the second communication method when the value is equal to or greater than a predetermined threshold. The first communication method is a communication method, such as http, based on a protocol that requires an immediate response (for example, an http response) to be made to a request (for example, an http request), while the second communication method is a communication method, such as SMTP, based on a protocol that does not require an immediate response (for example, an electronic mail). In responding to a processing request according to the first communication method, the electronic commerce system 1 processes, on a real time basis, an immediate processing request that requires transmission of a response, and sends a response to the immediate processing request, based on the processing result. Meanwhile, in responding to a processing request according to the second communication method, the electronic commerce system 1 stores a sequential processing request obtained based on an immediate processing request in a queue. One or more unprocessed sequential processing requests are stored in the queue, and the electronic commerce system 1 sequentially obtains and processes the sequential processing requests stored in the queue.

More specifically, the dispatch unit 52 obtains an immediate processing request received from the user terminal 2 (step S102). When a value indicating a load on the electronic commerce system 1 is equal to or less than a threshold (N at step S103) or the immediate processing request is not purchase instruction information (N at step S104), the dispatch unit 52 transfers the immediate processing request to any normal web server 5 (step S105). This transfer corresponds to determination to respond to the processing request according to the first communication method. In the above, the dispatch unit 52 selects a normal web server 5 to which to transfer the immediate processing request such that the loads are balanced among the plurality of normal web servers 5. Meanwhile, when the value of the load on the electronic commerce system 1 is higher than a threshold (Y at step S103) and the immediate processing request is purchase instruction information (Y at step S104), the dispatch unit 52 transfers the immediate processing request to the high load handling web server 7 (step S106). This transfer corresponds to determination to respond to the processing request according to the second communication method. Details on purchase instruction information or the like will be described later.

Figure 5:
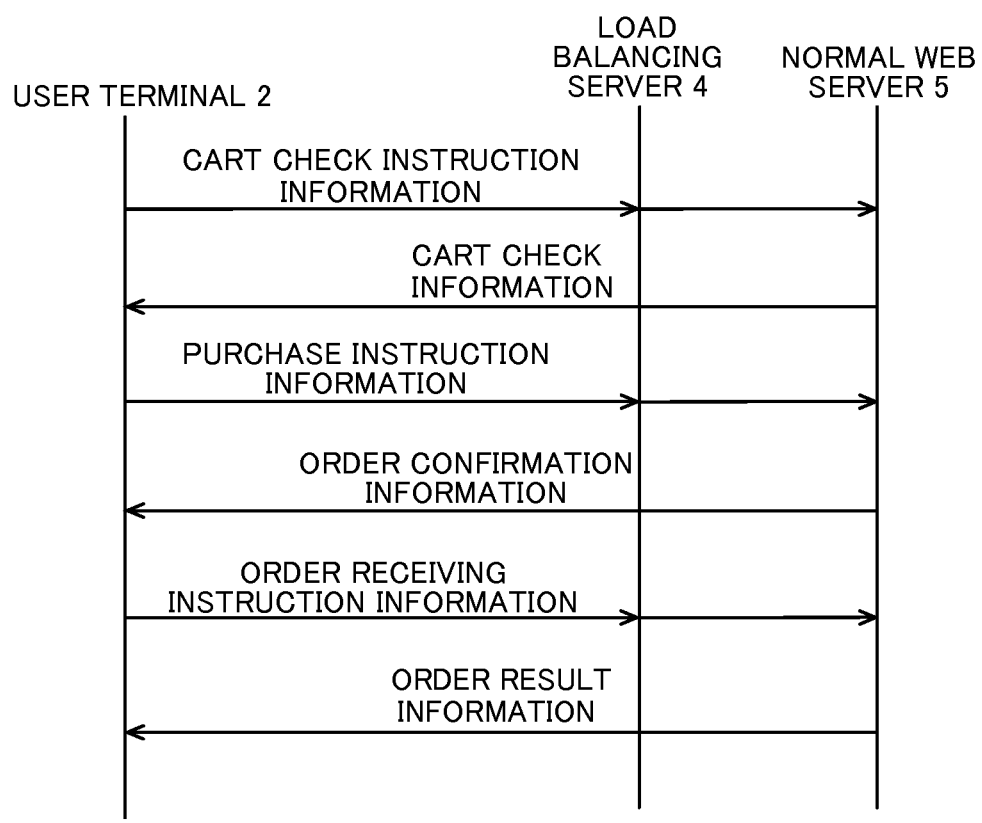
FIG. 5 is a sequence diagram showing one example of a flow of processing executed when only a first communication method is used.

In the following, a flow of processing that is executed when the first communication method is always used in responding to a processing request and relevant processing thereof will be described. FIG. 5 is a sequence diagram showing one example of a flow of processing that is executed when only the first communication method is used. This is substantially the same as the content of general processing executed in an electronic shopping mall site. Cart check instruction information, purchase instruction information, and order receiving instruction information in this diagram are information to be sent as immediate processing requests (that is, information to be sent together with an http request that requires an immediate response). Note that a request and a response including information for displaying a screen image for product selection is actually available, though not shown in this diagram. The cart check information, the order confirmation information, and the order result response are responses to the cart check instruction information, the purchase instruction information, and the order receiving instruction information, respectively, and included in, for example, HTML data or the like for displaying a screen image on a browser or the like of the user terminal 2 (that is, information to be sent together with an HTTP response, or an immediate response). A series of immediate processing requests, namely, the cart check instruction information, the purchase instruction information, and the order receiving instruction information, constitutes a transaction of a flow of processing. An immediate processing request includes an ID for specifying a transaction to which the immediate processing request belongs (for example, a session ID for identifying an http session or a character string corresponding thereto (for example, a character string resulting from conversion of a session ID according to a predetermined rule)). A session ID is generated by the normal web server 5 at initial access from the user terminal 2, and stored as a cookie or the like in a browser of the user terminal 2 or the like.

The immediate processing request receiving unit 53 is implemented mainly using the processor 21, the storage unit 22, and the communication unit 23 of the normal web server 5. The immediate processing request receiving unit 53 receives, via the communication unit 23, the immediate processing request sent from the dispatch unit 52, and transfers to the immediate processing unit 54.

The immediate processing unit 54, and the cart processing unit 55, the order confirmation unit 56, and the order immediate processing unit 57 included in the immediate processing unit 54 are implemented mainly using the processor 21, the storage unit 22, and the communication unit 23 of the normal web server 5. The cart processing unit 55, the order confirmation unit 56, and the order immediate processing unit 57 process data on an order included in the cart check instruction information, the purchase instruction information, and the order receiving instruction information respectively, and send an http response including a result of processing to the user terminal 2.

Specifically, based on the cart check instruction information, the cart processing unit 55 retrieves information on a shopping cart from the database server 6 or a cache in the storage unit 22, then generates cart check information for showing a shopping cart check screen image including retrieved information such as the name and price of a product added to the shopping cart, and sends the cart check information as an http response to the user terminal 2. Note here that the cart check instruction information is sent from the user terminal 2 when a user selects a product and adds the product to a shopping cart or presses a button for checking the shopping cart in electronic commerce transaction.

FIG. 6 shows one example of the shopping cart check screen. The shopping cart check screen shows information on a shop that sells a product added to the shopping cart, information, such as a product name and a price, obtained from a product master in the database, and information, such as the quantity of the product, obtained from the cart information. The shopping cart check screen further includes, as to each product, a check box for designating whether or not to buy the product and a remove button for designating whether or not to remove the product from the shopping cart. When a user presses the remove button, the user terminal 2 sends, to the electronic commerce system 1, the cart check information. The cart check information includes an information that indicates the product is to be removed from the shopping cart. When a user presses a proceed to purchase button, the user terminal 2 sends purchase instruction information to the electronic commerce system 1.

Based on the purchase instruction information, the order confirmation unit 56 obtains settlement information and shipping information for the user from the client database, and generates information on a payment amount. Then, the order confirmation unit 56 generates order confirmation information for showing an order confirmation screen including a payment amount, settlement information, and shipping information, and sends the order confirmation information as an http response to the user terminal 2. The order confirmation unit 56 stores order information on a product yet to be confirmed in the order database.

FIG. 7 shows one example of the order confirmation screen. The order confirmation screen shows information on a payment method for use in paying of a product, whether or not to use points, a shipping method, and a shipping destination. These information items are stored in the client database with the user as a key. In the client database, information on a payment method and a shipping destination to be outputted to the order confirmation screen is stored. When a user presses an edit button shown on the right side of each item, the user can edit the information. When order receiving instruction information to indicate that the information is to be edited is sent from the user terminal 2, the order confirmation unit 56 sends order confirmation information for showing an edited order confirmation screen. When a user presses a "place order button, the user terminal 2 sends order receiving instruction information to the electronic commerce system 1.

Based on the order receiving instruction information, the order immediate processing unit 57 executes processing for proceeding response to the order received. Specifically, the order immediate processing unit 57 executes processing, including settlement processing and stock allocation processing, with respect to an order from a user. More specifically, as to an order designated by the order receiving instruction information, the order immediate processing unit 57 executes payment processing in accordance with a payment type, then accesses a stock database of the shop to allocate a product stock, if any, and instructs an outside system to ship the product with an allocated stock. Payment processing is processing relevant to authorization and sales when the payment method is to use a credit card, for example, and is processing for an outside system to issue a transfer request form when the payment is made by bank transfer. Meanwhile, when there is no product stock available for allocation, the order immediate processing unit 57 handles the order as error or keeps the order as being reserved. In shipping instruction, the order immediate processing unit 57 instructs a batch processing system to execute shipping preparation processing or the like in accordance with a situation of stock allocation, a result of payment, or the like. The order immediate processing unit 57 updates information on the order, based on a payment status or the like. In the update, the order immediate processing unit 57 sets the time when this processing is being executed as an order time in the order information. Then, when the order is received through the above described processing, the order immediate processing unit 57 generates and sends an order result response for showing a screen image including information to that effect and an order number. Meanwhile, when the order ends in error, the order immediate processing unit 57 generates and sends an order result response for showing a screen image including information to that effect.

The processing of the order immediate processing unit 57 may likely take time to be completed and impose much load on the system as the processing involves update of the order information and cooperation with an outside system. However, as the processing of the order immediate processing unit 57 is important in that it is for receiving an order from a client, the processing is inevitable. In a conventional system using only the first communication method in executing the processing, a load imposed due to the processing of the order immediate processing unit 57 that should be completed within a very short period of time after receiving an order receiving instruction information before sending an order result response may become concerned. Moreover, there may be a case in which an electronic shopping mall takes place a campaign for giving special privilege to a user on condition that the user finishes a predetermined purchase within a predetermined period of time (that is, a type of campaign in which the receipt time of order information is critically important in determining whether or not to apply the campaign), and in such a case, many users often access the electronic shopping mall system at a time close to the end of the campaign period in order to get application in the limited time campaign. Accordingly, access congestion in view of the entire capacity of the electronic shopping mall system is likely caused at a time close to the end of the campaign period. In this case, dynamic reinforcement of the hardware, for example, is difficult to be employed.

In the following, another flow of processing and relevant processing will be described. The flow of processing is executed when not only the first communication method but also the second communication method are used in order to address the above described conventional problem. FIG. 8 is a sequence diagram showing one example of a flow of processing when the first communication method and the second communication method are both used. The cart check instruction information and the purchase instruction information in this diagram are immediate processing requests. The cart check instruction information and tentative response information are http responses to the cart check instruction information and the purchase instruction information, respectively, and are HTML data or the like for showing a screen image on a browser or the like of the user terminal 2.

Specifically, the dispatch unit 52 transfers the cart check instruction information to the normal web server 5. The content of this processing is similar to that which has been described with reference to FIG. 5, and thus not described again here. A request and a response for displaying a screen image for product selection, not shown in FIG. 8, is processed by the normal web server 5. Processing up to the processing of the cart processing unit 55 is executed in the normal web server 5 because of some reasons. One of the reasons is that it is difficult to confirm an order unless an operation for product selection is executed. That is, although information on a payment method and a shipping method used in principle can be set in advance, real time processing using a web is highly required for product selection. Another reason is that a load imposed on the system is smaller than that imposed due to processing relevant to a subsequent screen. In processing of the cart processing unit 55, although access to and update of the transaction data such as order information occurs, the number of data to be accessed is limited. Thus a load due to the processing is smaller than that imposed by the order immediate processing unit 57 or the like.

When it is determined to use the second communication method, the dispatch unit 52 transfers the purchase instruction information sent from a user to the high load handling web server 7.

The tentative response unit 58 is implemented mainly using the processor 21, the storage unit 22, and the communication unit 23 of the high load handling web server 7. With respect to the immediate processing request that is transferred when it is determined to respond thereto according to the second communication method, the tentative response unit 58 sends to the user terminal 2 tentative response information as an http response for showing a screen to the effect that a procedure for the order is to be proceeded with a sequential processing request. The tentative response information does not include an element, such as a button or a link, to be shown in a screen image of the user terminal 2, for sending an immediate processing request. Thus it is possible to prevent a subsequent access according to the first communication method (http or the like) in a transaction, and to lead a user to make an access according to the second communication method (a mail or the like).

Further, the tentative response unit 58 stores, in a mail transmission waiting queue for use by the mail sending server 8 to send information, information (referred also as a sequential purchase request) for specifying the order included in the immediate processing request for causing a user to send a sequential processing request. Note that an immediate processing request subjected to the processing of the tentative response unit 58 is purchase instruction information.

FIG. 9 shows one example of a flow of processing of the tentative response unit 58. Initially, the tentative response unit 58 obtains the immediate processing request transferred from the dispatch unit 52 (step S201), and then stores, in the mail transmission waiting queue, information (a sequential purchase request) for specifying the order (step S202). Then, tentative response unit 58 sends, as a response to the immediate processing request, tentative response information for showing a screen image showing that a mail to lead a user to send a sequential processing request is going to be sent to the mail address of the user (step S203).

The transmission request unit 59 is implemented mainly using the processor 21, the storage unit 22, and the communication unit 23 of the mail sending server 8. The transmission request unit 59 sends, to a user having sent the immediate request that is a purchase instruction information, transmission request information for asking to send a sequential processing request by way of the second communication method (a communication protocol not requiring a response). The transmission request information is an order confirmation mail in the example shown in FIG. 8. In other words, the transmission request unit 59 sequentially obtains the sequential purchase requests stored in the mail transmission waiting queue, and sends transmission request information to a user having made an order designated by the sequential purchase request obtained. In still other words, using the transmission request information, the transmission request unit 59 leads the user to send a (sequential) processing request to the electronic commerce system 1 by way of the second communication method.

FIG. 10 shows one example of a flow of processing of the transmission request unit 59. Initially, the transmission request unit 59 included in the mail sending server 8 obtains one sequential purchase request from the mail transmission waiting queue according to the order in which the sequential processing requests are stored therein (step S301). Then, the transmission request unit 59 obtains information for specifying an order from the sequential purchase request and obtains information on the order and information such as a mail address of a client from the order database and a client database (step S302). Note that the information on an order obtained by the transmission request unit 59 is the same as that obtained by the order confirmation unit 56. Thereafter, in the case where the product included in the order is a type of a product which can no longer be ordered once the products run out, such as a reservation for a limited quantity product or a limited number service, the transmission request unit 59 allocates a stock to the order (step S303). Note that stock allocation made by the transmission request unit 59 here is a type of reservation, or tentative stock allocation. That is, the allocated stock may be automatically cancelled in a subsequent process.

Then, the transmission request unit 59 generates a mail receiving address for this transaction on a one-to-one basis (step S304). A mail receiving address is used as an address at which the mail receiving server 9 receives an order receiving instruction mail that is a sequential processing request. Specifically, the transmission request unit 59 generates a mail receiving address, using a hush function or the like. A mail receiving address is information for correlating an immediate processing request sent by the first communication method and a sequential processing request (an order receiving instruction mail here) to be sent from a terminal (the user terminal 2 or other terminals) operated by a user in response to transmission request information. A mail receiving address enables specification of a transaction and a session ID. A mail receiving address is generated using a hush function, and prevents a user from being specified based on a mail receiving address. Thereafter, the transmission request unit 59 forwards the mail receiving address to the mail address management unit 60 of the mail receiving server 9 (step S305), and also adds this mail address to the order information relevant to this transaction in the order database so as to store therein.

In addition, the transmission request unit 59 generates the text of an order confirmation mail (the transmission request information) (step S306), and sends the generated order confirmation mail to the mail address of a user having made the order relevant to the sequential purchase request (step S307). In the above, the transmission request unit 59 sets the generated mail receiving address in an In-Replay-To field in sending the order confirmation mail. By sending an order confirmation mail including the mail receiving address, the transmission request unit 59 can have a user to send a reply (an order receiving instruction mail) to the order confirmation mail, as a sequential processing request correlated to the immediate processing request.

FIG. 11 shows one example of the order confirmation mail. Similar to the order confirmation screen, the order confirmation mail includes information such as a payment method for payment of a product, whether or not to use points, a shipping method, and a shipping destination. These information items are stored in the client database with the user as a key. However, different from the order confirmation screen, it is necessary to access again the web page in a site of the electronic shopping mall when editing the content. The order confirmation mail includes a text which indicates that the order will be received upon the user s sending an order receiving instruction mail. In the case where a payment method and a shipping method which a user uses are set in advance, a possibility of editing the payment method or the like is sufficiently smaller compared to that in an otherwise case.

The processing of the transmission request unit 59 may be implemented in the high load handling web server 7. In this case, the transmission request unit 59, instead of the tentative response unit 58, may receive an immediate processing request, and send a transmission request information to the user terminal 2 as a response to the immediate processing request. The transmission request information is information for showing a screen including content corresponding to the order confirmation mail and an element for having a user to send a mail to the mail receiving address. This element is any of a text, an image, and a button having mailto linked thereto, for example, and activates a mail generation screen including necessary information, such as a transmission destination or the like, upon detection of a predetermined operation (for example, press, tap, or the like) relative to the element. This arrangement does not need a mail transmission waiting queue, different from an arrangement in which an order confirmation mail is sent, though processing of the transmission request unit 59 on a real time basis is necessary. As a result, it is possible to reduce the entire load on the system to some extent and also to level the load on the system when access peaks, though control of a load on the system becomes less easy.

The mail receiving server 9 is a server for receiving a mail from a user. The mail receiving and storing unit 61 included in the mail receiving server 9 is implemented mainly using the processor 21, the storage unit 22, and the communication unit 23. The mail receiving and storing unit 61 receives order receiving instruction mails (sequential processing requests) sent from a plurality of users to the respective mail receiving addresses, and stores the mails in the mail receiving queue. In the above, the mail receiving and storing unit 61 stores a received time at which each order receiving instruction mail is received, together with the main body of the mail in the mail receiving queue, and sends a receipt acknowledge mail to the mail address of a sender. In the above, the mail receiving and storing unit 61 stores the mails sent to any mail receiving addresses in one mail receiving queue. The mail receiving and storing unit 61 may be a so-called mail server software.

The mail address management unit 60 included in the mail receiving server 9 is implemented mainly using the processor 21, the storage unit 22, and the communication unit 23. The mail address management unit 60 manages the mail receiving address. Specifically, the mail address management unit 60 stores a plurality of mail receiving addresses together with respective generation times in the storage unit 22, and controls such that the mail receiving and storing unit 61 permits receiving at one or more mail receiving addresses stored in the storage unit 22. Further, the mail address management unit 60 deletes a mail receiving address with a predetermined period of time (for example, thirty minutes, one hour, or the like) elapsed after the generation time thereof from the storage unit 22 so as to invalidate the address, and controls such that the mail receiving and storing unit 61 does not receive an order receiving instruction mail addressed to such a mail receiving address with a predetermined period of time elapsed but sends an error mail.

As an error mail is sent with respect to an order receiving instruction mail sent to a mail receiving address with a predetermined period of time elapsed after generation thereof, as described above, it is possible to notify a user of failure in receiving an order much earlier.

The sequential processing unit 62 included in the sequential processing server 10 is implemented mainly using the processor 21, the storage unit 22, and the communication unit 23. The sequential processing unit 62 sequentially obtains the sequential processing requests stored in the mail receiving and storing unit 61, and processes the data included in the sequential processing the obtained request.

Figure 12:
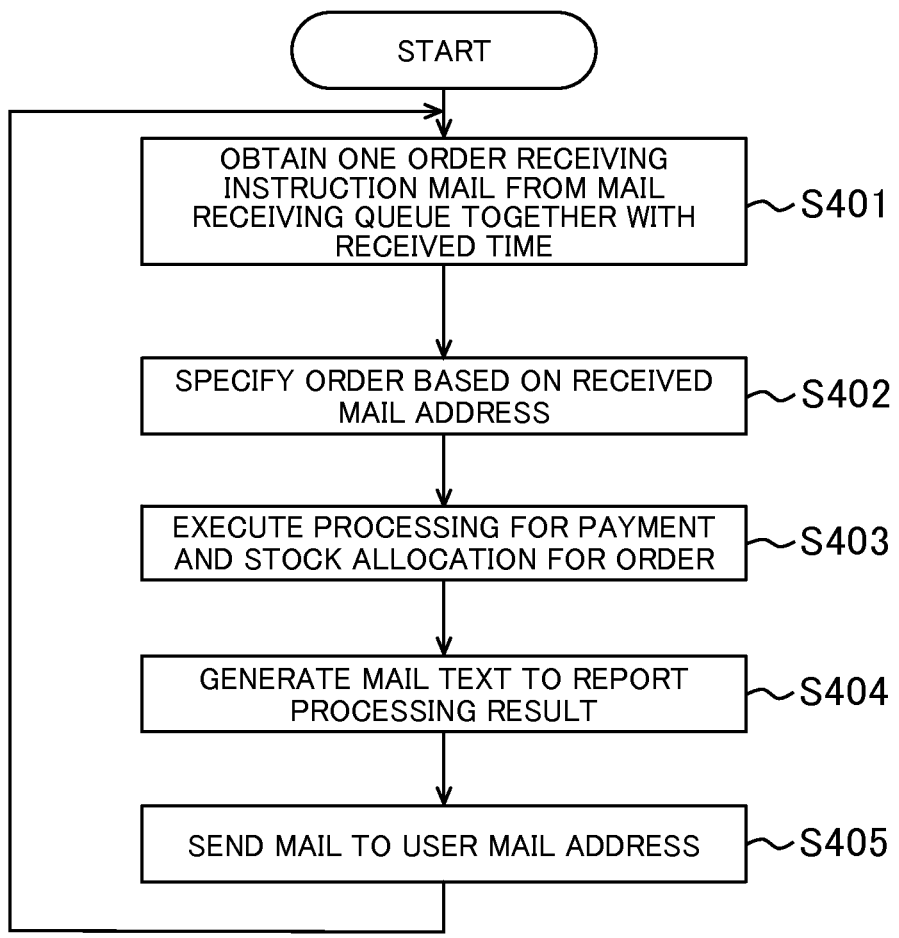
FIG. 12 shows one example of a flow of processing of a sequential processing unit.

FIG. 12 shows one example of a flow of processing of the sequential processing unit 62. Initially, the sequential processing unit 62 obtains, from the mail receiving queue, one order receiving instruction mail (a sequential processing request) received earliest together with the mail receiving address and the received time thereof (step S401). Specifically, the sequential processing unit 62 obtains an order receiving instruction mail received earliest, using POP3, for example, from the mail receiving queue, and deletes the obtained order receiving instruction mail from the mail receiving queue.

Note that the sequential processing unit 62 may not necessarily obtain the order receiving instruction mail according to the order of the received time. For example, the sequential processing unit 62 may obtain an order receiving instruction mail, based on the attribute of the order relevant to the order receiving instruction mail. In this case, instead of storing in the mail receiving queue, the mail receiving and storing unit 61 performs an operation, with respect to order information having a mail receiving address at which the mail has been received among those stored in the order database stored in the database server 6, for storing a sequential processing flag that indicates that the mail has been received but not yet processed and the received time thereof. Then, the sequential processing unit 62 sorts, by a predetermined condition, the order information items with the setted sequential processing flags so as to obtain one or more order information items according to the order of the sorted order information items sorted, and executes subsequent processing with respect to the obtained order information item/items.

As a sort key, for example, an attribute in accordance with the type of a product or a service is used. For example, the sequential processing unit 62 may conduct sorting such that order information relevant to a product or a service, such as a limited time product or accommodation service (including one for today), a custom made product, and the like, which requires early processing are resulted in superior, and order information relevant to a product or a service of digital content, a product with stock allocated or much stocks available are resulted in subordinate. This makes it possible to execute preferentially order receiving processing relevant to a product or a service of which order should be fixed early.

Alternatively, a type of a shop, the number of required days for delivery, which is determined depending on the relationship between a sender and a shipping destination, a settlement method, a standard number of days from order receipt to delivery, and the like, may be also used as a sort key.

Thereafter, the sequential processing unit 62 specifies an order, based on the mail receiving address (step S402). Specifically, the sequential processing unit 62 searches the order information database, for example, based on the mail receiving address, to specify an order relevant to the order receiving instruction mail.

Then, the sequential processing unit 62 executes processing for payment and stock allocation with respect to the order (step S403). This processing corresponds to the processing of the order immediate processing unit 57. More specifically, as to a specified order, the sequential processing unit 62 executes payment processing in accordance with the payment type, then accesses the stock database of a shop to allocate a product stock, if any, and instructs an outside system to ship the product with a stock allocated. Meanwhile, in the case where no product stock is available for allocation, the sequential processing unit 62 handles the order as error or puts the order in a reserved state. The sequential processing unit 62 updates order information, based on a payment status or the like. In the update, the sequential processing unit 62 sets, in the order information, the received time of the order receiving instruction mail (a sequential processing request) as a received time of the order information. When the order is received as a result of the above described processing, the sequential processing unit 62 generates a processing result notifying mail including information to that effect and an order number, while when the order ends in error, the sequential processing unit 62 generates a processing result notifying mail including information to that effect (step S405). The generated processing result notifying mail is sent to the mail address of the user (step S406) before the processing at step S401 and thereafter is repeated.

When it is determined to respond by way of the first communication method, the immediate processing unit 54 executes processing in parallel, for example, in order to respond to the immediate processing requests from users on a real time basis. Therefore, access congestion increases a load on the electronic commerce system 1. Meanwhile, as the sequential processing unit 62 sequentially executes sequential processing requests stored in a queue (the mail receiving queue), the number of sequential processing requests being processing in parallel remains constant (one in the example in this embodiment). That is, as access congestion merely increases the sequential processing requests stored in the queue, increase of a load on the electronic commerce system 1 due to processing the sequential processing request is limited. Moreover, as it is often a case that a period of time with access congestion lasts only short, it is expected that increase of a period of time necessary for processing to some extent makes it possible to process without problem even though the number of sequential processing requests stored in the queue increases. With the above, it is possible to level the load of processing when access peaks, and thus to reduce the processing capability of a hardware and a network necessary for responding to accesses from users at peak.

Use of an order time as a received time of a sequential processing request makes it possible to avoid giving disadvantage to a user having made an order of which order time is important in campaign or the like. Further, with the above, a user can be freed from accessing an electronic commerce system 1 which can be hardly accessed in order to obtain a special privilege in campaign or the like.

The deallocation unit 63 included in the sequential processing server 10 is implemented mainly using the processor 21, the storage unit 22, the communication unit 23. The deallocation unit 63 cancels stock allocation when a predetermined period of time (for example, one hour) has elapsed since the transmission request unit 59 has made tentative stock allocation. As described with reference to the transmission request unit 59, tentative allocation is made with respect to a limited quantity product or the like. That is, when a user has ordered a limited quantity product but seems not to confirm the order, the deallocation unit 63 deallocates the tentative stock so that other users can buy the product with deallocated stock.

Although an embodiment of the present invention having been described in the above, an embodiment of the present invention is not limited to the above described. For example, the transmission request unit 59 may sent not only one transmission request information (an order confirmation mail) relative to one immediate processing request but also one or more additional transmission request information items correlated to the immediate processing request, and a description on product confirmation and a payment method may be included in each transmission request information. The sequential processing unit 62 may execute processing for payment, stock allocation, or the like when a plurality of order confirmation mails are all responded. This can reduce the amount of texts which a user reviews at one time and also prevent a possibility of erroneous fix of an order when an attack of sending to a random mail address be made from outside.

Although the dispatch unit 52 determines whether to use the first communication method or the second communication method in order to handle access congestion in the above description, the determination may be made based on other criteria. For example, the dispatch unit 52 may determine to use the second communication method when there is hardware defect of the normal web server 5 or network defect between the normal web server 5 and the load balancing server 4. Alternatively, information including personal information or financial information may be sent according to the second communication method when the user terminal 2 is a shared terminal. Still alternatively, the dispatch unit 52 may determine to send an order confirmation mail according to the second communication method when there is a period with no access from a user lasting for a predetermined period of time or longer in a transaction (for example, after sending the shopping cart check screen information).

The dispatch unit 52 may dispatch the immediate processing requests, based on the rank of a user. For example, rank specifying information for specifying a rank of each user may be stored in advance in the database server 6, and the dispatch unit 52 may determine whether to use the first communication method or the second communication method, based on the rank specifying information of a user having sent an immediate processing request. More specifically, the load balancing server 4 may have a rank obtaining unit for obtaining a user ID from which an immediate processing request and rank specifying information relevant to a user with the user ID, and the dispatch unit 52 may determine to give a reaction using the second communication method when the rank specified by the rank specifying information is within a predetermined range, such as being higher or lower than a threshold. Further, the dispatch unit 52 may dispatch immediate processing requests, based on both of a load and the rank of a user. In this case, the range of a system load value is divided into a plurality of levels in advance, and the rank of a user is correlated to any level. A higher rank of a user is correlated to a larger level. That is, when the system load value is equal to or greater than a value representing the level correlated to the rank of a user and the immediate processing request is of a predetermined kind, the dispatch unit 52 determines to use the second communication method. Note that a value representing the level may be a threshold indicating an upper or lower limit of the level. In this case, a plurality of thresholds each making a boundary for dividing the range of system load values into a plurality of levels are determined in advance, and the rank and the threshold are correlated to each other such that a higher rank is correlated to a larger threshold.

Determination as to whether to use the first communication method or the second communication method may not be made with respect to all processing requests. For example, in the case where the second communication method is once used, subsequent communication between the user terminal 2 (any other terminal operated by the user) and the electronic commerce system 1 may be conducted using the second communication method.

Although communication, such as a sequential processing request, not requiring a response is conducted by means of mail in the above, any other communication methods may be used instead. For example, a short message service (SMS), a push mail to a messenger or a smart phone, or the like may be used in communication from the electronic commerce system 1 to the user terminal 2, and a short message service (SMS) or a messenger may be used for communication from the user terminal 2 to the electronic commerce system 1.

The invention claimed is:
1. A request processing system, comprising:
a first server for receiving a processing request sent from a request sender by way of a first communication method that is HTTP;
a second server for receiving a processing request sent from the request sender by way of a second communication method that is an electronic mail;
a load obtaining server configured to obtain a value indicating a magnitude of a load on a system; wherein said load obtaining server is configured to determine, based on the load on the system, one of a first mode of communication and a second mode of communication with respect to request processing;

said first server being configured to send, if the first mode of communication is determined, a first piece of leading information which leads the request sender to send, by way of the first communication method, a second processing request which follows the first processing request; and a third server being configured to send, if the second mode of communication is determined, a second piece of leading information which leads the request sender sending, by way of the second communication method, a second processing request which follows the first processing request, wherein the first communication method is a method in which a response to the processing request is made within a predetermined period of time, and the second communication method does not require a response to the processing request, wherein, when the second server receives the second processing request by the electronic mail, the request processing system stores the second processing request in a queue, sequentially processes one or more second processing requests stored in the queue, and sends an electronic mail indicative of a processing result.

2. The request processing system according to claim 1, wherein when the first server receives the second processing request as an HTTP request, the request processing system sends an HTTP response indicative of a processing result.

3. The request processing system according to claim 1, wherein when the first mode of communication is determined, the request processing system sends a response including information for the request sender to send the second processing request by way of the first communication method, and when the second mode of communication is determined, the third server sends a response including information for the request sender to send the second processing request by way of the second communication method.

4. The request processing system according to claim 1, wherein the third server is configured to inform the request sender of destination, specifying information for specifying a destination to which the processing request is sent by way of the second communication method.

5. The request processing system according to claim 4, wherein the third server is configured to send leading information including the destination specifying information to a destination designated by the request sender by way of the second communication method.

6. The request processing, system according to claim 5, wherein the third server is configured to send confirmation requesting information including required confirmation information which the request sender should confirm in connection with a transaction including the processing request to the destination separately from the leading information by way of the second communication method in order to lead the second processing request to be sent to a destination specified by the destination specifying information by way of the second communication method in reply to the required confirmation information.

7. The request processing system according to claim 6, wherein the third server is configured to reply that the confirmation requesting information is sent by the second communication method with respect to another request sent from the request sender by way of the first communication method immediately before the second processing request.

8. The request processing system according to claim 6, wherein the third server is configured to generate the destination specifying information for every transaction.

9. The request processing system according to claim 8, wherein the second server is configured to invalidate, when a predetermined period of time elapses after the destination specifying information is generated by the third server, a destination specified by the destination specifying information.

10. The request processing system according to claim 9, further comprising:

a sequential processing server configured to deallocate, when the second server invalidates the destination specifying information, a stock tentatively allocated so as to be correlated to the destination specifying information invalidated;

and wherein a high load server is configured to allocate a stock of a product or a service that should be ordered in a transaction corresponding to the destination specifying information generated by the third server, so as to be correlated to the destination specifying information wherein the transaction including the processing request is made to order a product or a service.

11. The request processing system according to claim 1, further comprising:

a sequential processing server configured to execute, in sequence, the predetermined processing according to the second processing request sent by the second communication method, wherein said first server is further configured to execute a predetermined processing in response to the second processing request sent by the first communication method and responding to the request sender after completion of the predetermined processing.

12. The request processing system according to claim 11, wherein the sequential processing server is configured to execute while considering a time of receiving the second processing request by the second communication method as a received time of the second processing request.

13. The request processing system according to claim 12, wherein the second processing request is a request of order receiving processing for receiving an order of a product or a service, and the sequential processing server is configured to sort a plurality of second processing requests, based on an object of the order as a sort key, and collectively executes the order receiving processing for every object of the order.

14. The request processing system according to claim 1, wherein when the value obtained by the load obtaining server is equal to or greater than a predetermined threshold, the load obtaining server is configured to receive the second processing request by way of the second communication method.

15. A request processing method by networked computers, comprising:

receiving a processing request sent from a request sender by way of a first communication method that is HTTP;

receiving a processing request sent from the request sender by way of a second communication method that is an electronic mail;

obtaining a value indicating a magnitude of a load on a system;

determining, based on the load on the system, one of a first mode of communication and a second mode of communication with respect to request processing;

sending, if the first mode of communication is determined, a first piece of leading information which leads the request sender to send, by way of the first communication method, a second processing request which follows the first processing request,; and sending, if the second mode of communication is determined, a second piece of leading information which leads the request sender sending, by way of the second communication method, a second processing request which follows the first processing request, wherein the first communication method is a method in which a response to the processing request is made within a predetermined period of time, and the second communication method does not require a response to the processing request, wherein, when the second processing request by the electronic mail is received, the second processing request is stored in a queue, one or more second processing requests stored in the queue are sequentially processed, and an electronic mail indicative of a processing result is sent.

* * * * *